(12) United States Patent
Al-Anzi

(10) Patent No.: US 10,712,248 B2
(45) Date of Patent: Jul. 14, 2020

(54) APPARATUS FOR MEASURING DISENTRAINMENT RATE OF AIR

(71) Applicant: KUWAIT UNIVERSITY, Safat (KW)

(72) Inventor: Bader Al-Anzi, Abdullah Al Mubarak (KW)

(73) Assignee: Kuwait University, Safat (KW)

( * ) Notice: Subject to any disclaimer, the term of this patent is extended or adjusted under 35 U.S.C. 154(b) by 107 days.

(21) Appl. No.: 16/145,097

(22) Filed: Sep. 27, 2018

(65) Prior Publication Data

US 2020/0103324 A1 Apr. 2, 2020

(51) Int. Cl.
| | | |
|---|---|---|
| *G01N 11/02* | (2006.01) | |
| *B01F 15/00* | (2006.01) | |
| *B01F 3/04* | (2006.01) | |

(52) U.S. Cl.
CPC .......... *G01N 11/02* (2013.01); *B01F 3/04496* (2013.01); *B01F 15/00207* (2013.01)

(58) Field of Classification Search
CPC . B01F 15/00207; B01F 3/04496; G01N 11/02
See application file for complete search history.

(56) References Cited

U.S. PATENT DOCUMENTS

| | | |
|---|---|---|
| 2,406,179 A | 8/1946 | Walsh et al. |
| 3,410,057 A | 11/1968 | Lerner |
| 4,164,137 A | 8/1979 | Williamson |
| 4,636,168 A * | 1/1987 | Sandstrom ................ B22C 5/18 |
| | | 134/19 |
| 4,938,865 A * | 7/1990 | Jameson .................. B03D 1/02 |
| | | 209/164 |
| 5,018,869 A * | 5/1991 | Paul .................... B01F 13/0244 |
| | | 366/101 |

(Continued)

FOREIGN PATENT DOCUMENTS

WO 99/51324 A2 10/1999

OTHER PUBLICATIONS

Al-Anzi et al., "Air Entrainment Rates in a Confined Plunging Liquid Jet Reactor", Conference Paper (2006), 12 pages, printed from www.researchgate.net/publication/323945520_AIR_ENTRAINMENT_RATES_IN . . . on Jul. 30, 2018.

(Continued)

*Primary Examiner* — Nathaniel T Woodward
(74) *Attorney, Agent, or Firm* — Richard C. Litman; Nath, Goldberg & Meyer

(57) ABSTRACT

The apparatus for measuring disentrainment rate of air includes a Confined Plunging Liquid Jet Reactor (CPLJR) having a downcomer column surrounding a liquid jet. The end of the downcomer column is partially immersed in a receiving liquid pool contained in a reservoir. A conical ring is placed in the downcomer column below the liquid jet, the ring bearing against the wall of the downcomer column and forming a seal to define a headspace in the column. A gas supply and first bubble meter are connected to the column above the conical ring to supply gas and measure total entrainment. A second bubble meter connected to the headspace between the ring and the receiving pool measures disentrainment, and a third bubble meter connected to headspace above the receiving pool outside the column measures net entrainment.

9 Claims, 2 Drawing Sheets

(56) References Cited

U.S. PATENT DOCUMENTS

| | | | |
|---|---|---|---|
| 5,064,449 A * | 11/1991 | Ford | B01D 19/0078 |
| | | | 95/261 |
| 5,955,037 A * | 9/1999 | Holst | B01D 47/06 |
| | | | 406/193 |
| 6,942,801 B2 * | 9/2005 | Nishimura | C02F 11/02 |
| | | | 210/150 |
| 7,059,169 B2 | 6/2006 | Cummings et al. | |
| 7,981,201 B2 | 7/2011 | Xu | |
| 8,668,187 B2 | 3/2014 | Al-Anzi | |
| 9,550,156 B2 * | 1/2017 | Chien | B01F 5/0212 |
| 2011/0120945 A1 * | 5/2011 | Kaya | B01F 3/0865 |
| | | | 210/630 |
| 2013/0127072 A1 * | 5/2013 | Al-Anzi | C02F 1/74 |
| | | | 261/22 |
| 2016/0082366 A1 * | 3/2016 | Yang | B01D 19/0036 |
| | | | 96/216 |
| 2017/0144910 A1 * | 5/2017 | Al-Anzi | C02F 3/20 |

OTHER PUBLICATIONS

Schrank et al., "Investigation of Different Methods to Measure the Entrained Air Content in Hydraulic Oils", Proceedings of the ASME/BATH 2014 Symposium on Fluid Power & Motion Control (2014), 8 pages.

* cited by examiner

APPARATUS FOR MEASURING DISENTRAINMENT RATE OF AIR

BACKGROUND

1. Field

The disclosure of the present patent application relates to fluid mechanics, and particularly to an apparatus for measuring the disentrainment of air in a confined plunging liquid jet reactor.

2. Description of the Related Art

There are many industrial processes where it is necessary to mix a gas, such as air, with a liquid. Although sometimes a simple sparged system with a tube or air stone releasing bubbles directly below the surface of the water will suffice, for some processes, e.g., aerobic wastewater treatment, air pollution abatement, froth flotation and fermentation, an improved gas absorption rate is desirable. In such circumstances, a plunging jet reactor may be used to achieve a high mass transfer rate at low capital and operating cost.

Plunging jet devices improve gas absorption rates by creating a fine dispersion of bubbles and by increasing the contact time between the gas bubbles and the liquid at relatively low power inputs. A plunging jet may be operated as an unconfined device or as a confined device. In an unconfined plunging jet reactor system, a liquid jet plunges into an open liquid pool, creating a conical downflow dispersion of fine bubbles and a surrounding upflow of larger, coalesced bubbles. The penetration depth of the bubbles is small due to the spreading of the submerged jet, and hence the bubble contact time with the liquid is short.

In a confined system, a Confined Plunging Liquid Jet Reactor (CPLJR) uses a vertical tube or downcomer column that surrounds the liquid jet and that is partially immersed in the receiving liquid pool contained in a reservoir. Hence, the entrained bubbles may be carried to large depths by the liquid downflow. The top end of the tube is connected to a nozzle, while the other end (bottom) is left open to the receiving liquid pool. Although such jet reactors have been known and used for decades and many devices and theoretical models have been proposed for measuring and predicting the gas entrainment and disentrainment rates obtained or obtainable using the devices, none have been entirely satisfactory.

Thus, an apparatus for measuring disentrainment rate of air solving the aforementioned problems is desired.

SUMMARY

The apparatus for measuring disentrainment rate of air includes a Confined Plunging Liquid Jet Reactor (CPLJR) having a downcomer column surrounding a liquid jet. The end of the downcomer column is partially immersed in a receiving liquid pool contained in a reservoir. The apparatus may include a pump connected by conduit to the bottom of the reservoir and connected by conduit to a nozzle at the top of the downcomer column that forms the liquid jet to recycle the liquid. A conical ring is placed in the downcomer column below the liquid jet, the ring bearing against the wall of the downcomer column and forming a seal to define a headspace in the column. A gas supply and first bubble meter are connected to the column above the conical ring to supply gas and measure total entrainment. A second bubble meter connected to the headspace between the ring and the receiving pool measures disentrainment, and a third bubble meter connected to headspace above the receiving pool outside the column measures net entrainment. Since gases, in general, are sparingly soluble in liquid, the collected gases through the second and third bubble meters (that measure the disentrainment and net entrainment rates, respectively) can partially or entirely be recirculated through the first bubble meter. This could be very beneficial when dealing with expensive gases.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
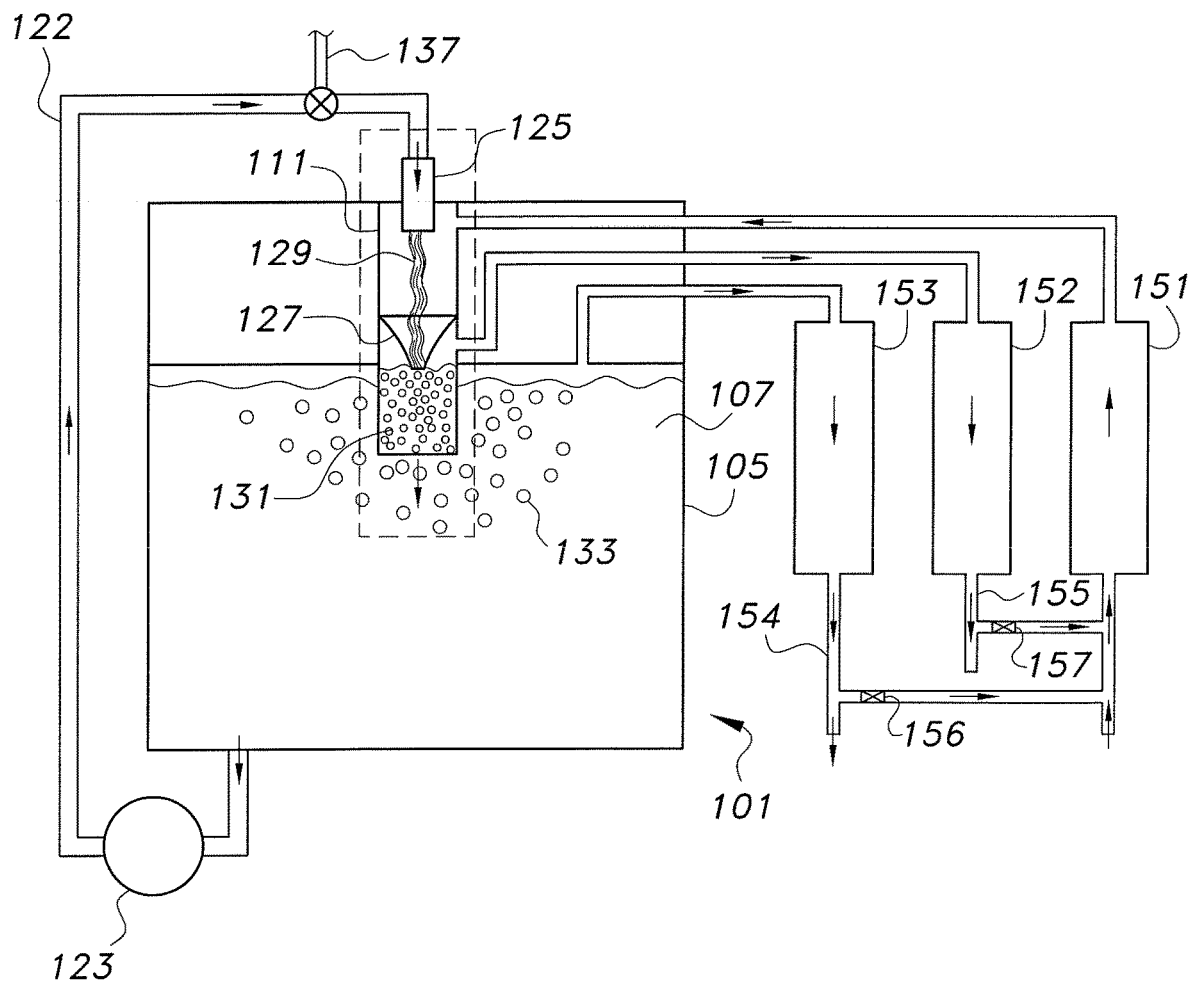
FIG. 1A is a schematic diagram of an apparatus for measuring disentrainment rate of air.
Figure 1B:
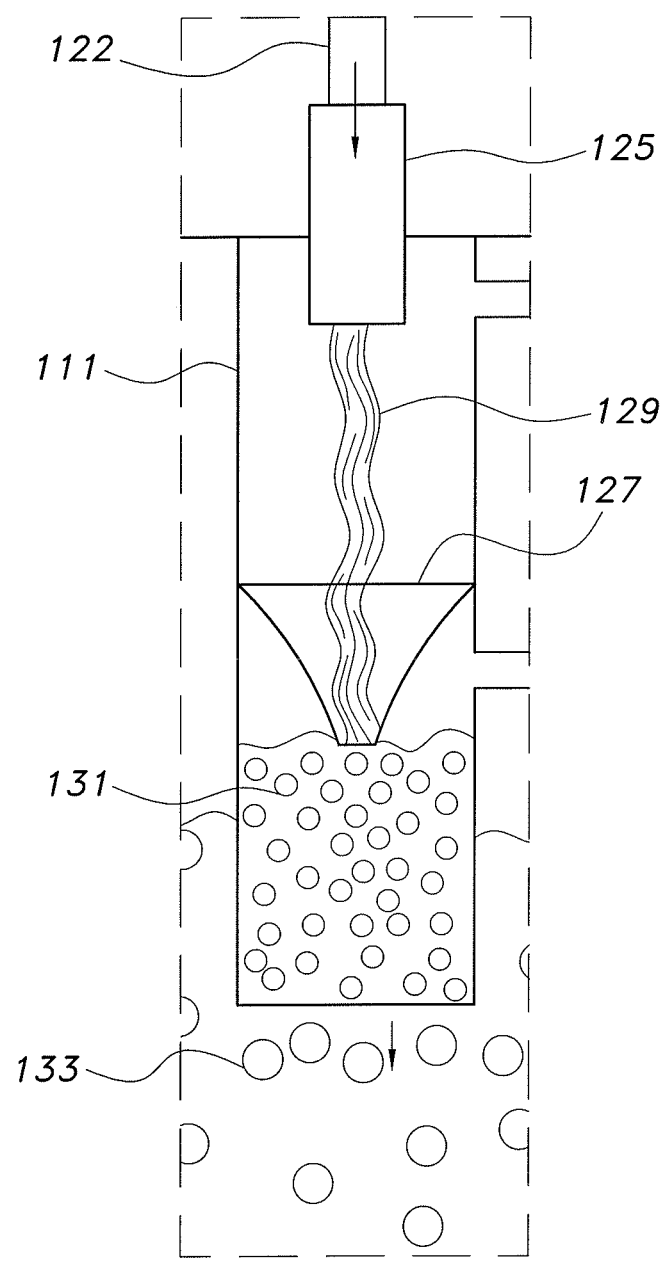
FIG. 1B is a schematic diagram of the downcomer column of the apparatus of FIG. 1B, showing the conical ring in greater detail.

Referring to FIGS. 1A and 1B, the apparatus 101 for measuring disentrainment rate of air includes a Confined Plunging Liquid Jet Reactor (CPLJR) having a downcomer column 111 surrounding a liquid jet 129. The end of the downcomer column 111 is partially immersed in a receiving liquid pool 107 contained in a reservoir 105. The apparatus 101 may include a pump 123 connected by conduit to the bottom of the reservoir 105 and connected by conduit 122 to a nozzle 125 at the top of the downcomer column 111 that discharges the liquid jet 129 to recycle the liquid. A conical ring 127 is placed in the downcomer column 111 below the liquid jet 129, the ring 127 bearing and abutting against the wall of the downcomer column 111 and forming a seal to define a headspace in the column 111 below the ring 127. A gas supply and first bubble meter 151 are connected to the column above the conical ring 127 to supply gas and measure total entrainment. A second bubble meter 152 connected to the headspace between the ring 127 and the receiving pool 107 measures disentrainment, and a third bubble meter 153 connected to headspace above the receiving pool 107 outside the column 111 measures net entrainment. Recirculation loops 154 and 155, connected through valves 156 and 157, are connected to the three bubbles meters 151, 152 and 153.

In an alternative, the liquid jet 125 may be supplied with liquid from an external source through conduit 137 controlled by a suitable valve.

In an aeration operation, liquid, which is typically recycled from reservoir 105, is injected into downcomer 111 through injection nozzle 125. Gas, which may be air, entering the downcomer column 111 from a gas source through the first bubble meter 151 and its associated conduit, is entrained into the flow of liquid 129 exiting the nozzle 125 under pressure from the pump 123 in a jet of liquid, traverses the opening in the conical ring and plunges into the receiving pool 107 in the reservoir. The majority of the gas is entrained in the liquid jet 129 as a fine dispersion of bubbles 131, carried to a greater depth than an unconfined system by the downcomer column, and exit the column 111 into the reservoir 105 entrained in the receiving pool 107. However, a portion of the bubbles 131 is disentrained in the column 111 and enters the headspace between the conical ring 127 and the receiving pool 107, and another portion of the bubbles 131 coalesce to form an upflow of larger bubble 133 entering the headspace outside the column 111 and above the receiving pool 107 beneath a ceiling of the reservoir 105.

The downcomer column 111 is formed as a vertical tube that is partially immersed in a receiving liquid pool 107 contained in the reservoir 105. The top end of the tube is connected to the injection nozzle 125, the distance between the nozzle 125 and the top surface of the receiving pool defining the length of the liquid jet 129. The other end (bottom) of the downcomer column 111 is left open to the receiving liquid pool 107 in the reservoir 105. In this configuration, the downcomer column 111 functions as a confining tube.

The CPLJR reactor is utilized to improve gas mass rate transfer into liquid. This is achieved by increasing the liquid jet 129 penetration depth and the contact time between the gas and liquid. The CPLJR reactor also improves transfer by increasing the gas-liquid contact surface through hindering or reducing the tendency of descending primary bubbles 131 to coalescence into secondary ascending secondary bubbles 133. The primary bubbles 131, being smaller, provide a better mass transfer rate. The increase in primary bubble contact with the liquid and the reduction of the tendency of the descending primary bubbles 131 to coalescence into secondary ascending secondary bubbles 133 may, in turn, enhance the plunging jet reactor efficiency with regards to mass transfer rate. In order to improve efficiency of the transfer rate, adjustments may be made in the pressure and velocity of the liquid discharged through the nozzle 125 and the depth of the downcomer column 111 in the reservoir 105, typically at a depth below the top surface of the liquid pool 107 in the reservoir 105.

In order to determine how much of the gas is being retained in the liquid, measurements are taken of the gas as it is supplied to the downcomer column 111 above the conical ring 127, disentrained inside the downcomer column 111 below the conical ring 127, and entrained above the pool 107 outside the column 111.

The disclosed technology provides a method for measuring the total air entrainment ($Q_{TA}$, measured at gas flow meter 151), the disentrainment rate ($Q_{DS}$, measured at gas flow meter 152) caused by bubbles rising up inside the downcomer column 111, and the measured/net air entrainment ($Q_N$, measured at gas flow meter 153). The determination of the disentrainment rate is significant because it (the rate of disentrainment) can be correlated with different properties of the fluid and of the system. The determination of entrainment may be used to adjust the depth of the downcomer column 111 below the top surface of the liquid 107 in the reservoir 105. The disclosed technology also provides a method of recirculating the undissolved and disentrained air through loops 154 and 155, connected through valves 156 and 157.

The use of the disclosed technique may lead to more results and new developments regarding the mechanisms and new correlation, which may reveal which of the two systems, i.e., unconfined or confined systems, render an increase in their air entrainment rate. This presents a method which may also help to develop a model that relates total entrainment rate ($Q_{TA}$) to disentrainment rate ($Q_{DS}$) and net entrainment rate ($Q_N$) as shown as:

$$Q_{TA} = Q_N f(V_j, L_j, D_C \& d_n) + Q_{DS} f(V_j, L_j, D_C \& d_n) \quad (1)$$

where $V_j$=Liquid jet flow rate from the nozzle; $L_j$=Liquid jet length; $d_n$=Nozzle diameter; $D_C$=Downcomer diameter; $Q_N$=Net/measured entrainment rate; $Q_{DS}$=Disentrainment rate; $Q_{TA}$=Total entrainment rate.

Once this is done an optimization model can be applied by increasing the net entrainment rate through minimizing the dis-entrainment rate.

It is to be understood that the apparatus for measuring disentrainment rate of air is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An apparatus for measuring disentrainment rate of air, comprising:
    a fluid reservoir having a ceiling;
    a receiving pool of liquid disposed in the fluid reservoir;
    a downcomer column having an upper end and a lower end, the column being tubular and extending through the ceiling of the reservoir, the lower end being partially immersed in the receiving pool of liquid;
    a nozzle mounted at the upper end of the downcomer column above the receiving pool of liquid;
    a liquid pump connected to the nozzle for pumping a liquid jet from the nozzle down the downcomer column into the receiving pool of liquid;
    a conical ring disposed in the downcomer column between the nozzle and the receiving pool of liquid, the conical ring defining a central opening for passage of the liquid jet through the conical ring into the receiving pool of liquid, the conical ring abutting and being sealed against the downcomer column;
    a total entrainment meter having a conduit opening into the downcomer column between the conical ring and the nozzle for introducing a gas into the downcomer column and measuring the total gas entrainment, the gas being entrained in the liquid jet passing from the nozzle into the receiving pool of liquid;
    a disentrainment rate meter having a conduit opening into the downcomer column between the conical ring and the receiving pool of liquid for measuring gas disentrained into the column above the receiving pool of liquid; and
    a net entrainment meter having a conduit opening into the reservoir at the ceiling of the reservoir above the receiving pool of liquid for measuring net gas entrained into the liquid.

2. The apparatus for measuring disentrainment rate of air according to claim 1, wherein the gas comprises air.

3. The apparatus for measuring disentrainment rate of air according to claim 1, further comprising a conduit connecting said pump to said reservoir, the pump being configured for recirculating the receiving liquid from the reservoir as the liquid jet discharged from said nozzle.

4. The apparatus for measuring disentrainment rate of air according to claim 1, wherein said total entrainment meter, said disentrainment rate meter, and said net entrainment meter each comprise a bubble meter.

5. The apparatus for measuring disentrainment rate of air according to claim 1, further comprising a recirculation loop connecting at least two meters selected from the group consisting of said total entrainment meter, said disentrainment rate meter, and said net entrainment meter.

6. The apparatus for measuring disentrainment rate of air according to claim 1, further comprising a first recirculation conduit having a valve disposed therein, the first recirculation conduit being disposed between said disentrainment rate meter and said total entrainment meter, the first recirculation conduit defining a first recirculation loop.

7. The apparatus for measuring disentrainment rate of air according to claim 6, further comprising a second recirculation conduit having a valve disposed therein, the second recirculation conduit being disposed between said net entrainment meter and said total entrainment meter, the second recirculation conduit defining a second recirculation loop.

8. A Confined Plunging Liquid Jet Reactor (CPLJR), comprising:
   a fluid reservoir having a ceiling;
   a receiving pool of liquid disposed in the fluid reservoir;
   a downcomer column having an upper end and a lower end, the column being tubular and extending through the ceiling of the reservoir, the lower end being partially immersed in the receiving pool of liquid;
   a nozzle mounted at the upper end of the downcomer column above the receiving pool of liquid;
   a liquid pump connected to the nozzle for pumping a liquid jet from the nozzle down the downcomer column into the receiving pool of liquid;
   a conical ring disposed in the downcomer column between the nozzle and the receiving pool of liquid, the conical ring defining a central opening for passage of the liquid jet through the conical ring into the receiving pool of liquid, the conical ring abutting and being sealed against the downcomer column, the conical ring defining a headspace in the column above the receiving pool of liquid for receiving gas entrained in the liquid jet and subsequently disentrained in the downcomer column; and
   a gas inlet conduit opening into the downcomer column between the conical ring and the nozzle for introducing a gas to be entrained in the liquid jet into the downcomer column.

9. The Confined Plunging Liquid Jet Reactor according to claim 8, further comprising a conduit connecting said pump to said reservoir, the pump being configured for recirculating the receiving liquid from the reservoir as the liquid jet discharged from said nozzle.

* * * * *